June 19, 1951  F. E. PECHNER  2,557,138
LATHE FIXTURE
Filed May 21, 1946
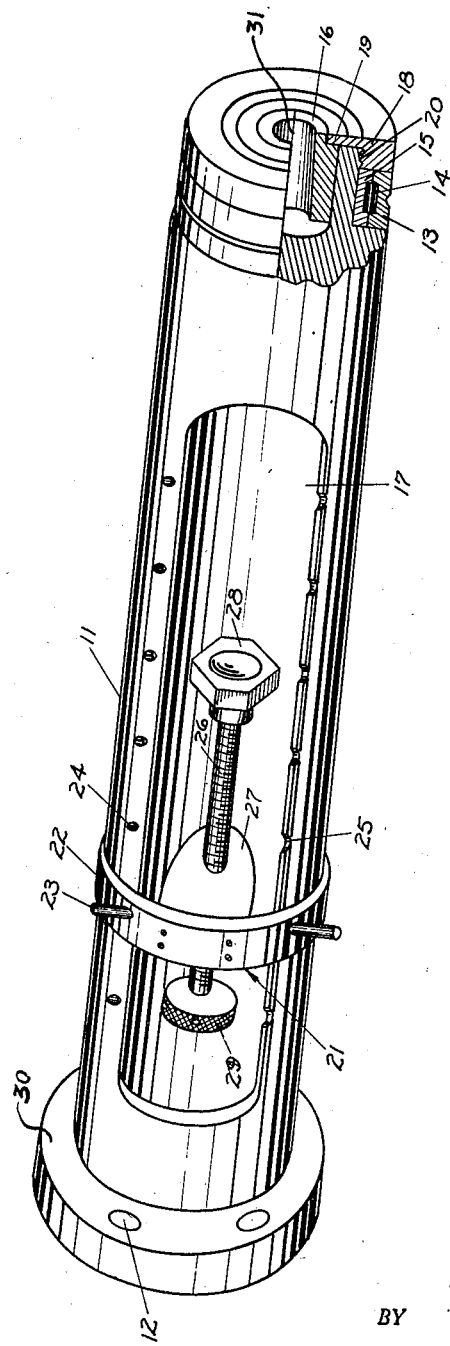
INVENTOR.
FRITZ E. PECHNER
BY M. Q. Hayes
ATTORNEY Patented June 19, 1951

2,557,138

UNITED STATES PATENT OFFICE 2,557,138

LATHE FIXTURE

Fritz E. Pechner, New York, N. Y.

Application May 21, 1946, Serial No. 671,333

5 Claims. (Cl. 279—1)

(Granted under the act of March 3, 1883, as amended April 30, 1928; 370 O. G. 757)

This invention relates in general to lathes, and in particular to a lathe fixture for supporting a workpiece positioned away from the faceplate. The device of the invention is adapted particularly to reclaim tools having tapered shanks, and which require remachining the shank. The tapered shanks referred to herein are those of such tools as reamers, drills, counterbores, and the like.

It is an object of this invention to provide a fixture that will eliminate the heretofore time consuming task of truing-up and indicating tapered shanks after they have been rebuilt and butt welded and then are to be refaced in a lathe.

It is a further object to provide a fixture adapted to be positioned in a lathe to permit rotation of the fixture relative to the lathe and that is further adapted to mount therewith a tapered shank to be refaced.

It is a still further object to provide means to facilitate the holding of varied sized and tapered sleeves quickly and accurately, said sleeves accommodating a plurality of sizes and tapers of shanks to be refaced.

Further objects and advantages of this invention, as well as its construction, arrangement and operation, will be apparent from the following description and claims in connection with the accompanying drawings, in which, The figure is a perspective view partly in section so as to show completely the mechanics of the invention.

In the embodiment of the invention disclosed in the drawing, the work support comprises a body 11 that is barrel shaped. An attachment 30 at one end of the body member 11 is adapted to engage the faceplate of a lathe, and constitutes a flanged ring with a set of holes 12 adapted to accommodate cap screws, for example, that hold the ring 11 in abutting engagement with the lathe faceplate. The construction enables the fixture, and accordingly the workpiece, to be centered with reference to the lathe spindle.

A chuck 16 is provided at the end of the body 11 opposite the attachment 30. The chuck 16 is similar to a collet chuck, comprising a collar or sleeve made up of a plurality of jaws with jaw faces 31 contoured to cumulatively fit the interior surface of the workpiece, not shown. In the case of the fixture being adapated to support tools having tapered shanks, the contour of the cumulative jaw faces 31 is made frusto-conical to fit the standard taper of the tool shank. The lock nut 18 is screw threaded at 20 for engagement with the body 11 at its end, and the nut 18 engages the shoulder 19 of the chuck 16 to hold the chuck 16 located at the end of the fixture remote from the attachment 30. Chucks 16 of different sizes, and chucks with jaw faces 31 contoured differently to fit differently contoured exterior surfaces of different workpieces, are provided and adapted to be interchangeably held in the fixture by means of the nut 18.

The end of the body 11 opposite the flange 30 is supported in the steady rest, also not shown in the figure, of a lathe. The steady rest is mounted around the outer race 13, rotation of barrel 11 relative to outer race 13 being accomplished by means of bearings 14 between the outer race 13 and the inner race 15.

The body 11 includes the opening 17 to enable workpieces to be positioned inside it. In the case of the workpiece constituting a tool with a tapered shank to be remachined, the shank of the tool is held rigidly in position by means of a backstop generally designated 21. The backstop 21 comprises a truss band 22 circumscribing the barrel 11, the truss band being movable along the longitudinal axis of said barrel 11 and adapted to be secured to the barrel 11 at certain definite intervals by means of pins 23 inserted in holes 24 and 25. The movement and securing of the truss band 22 at any of the definite intervals of holes 24, 25 provides a rough adjustment of the backstop 21 with respect to the final position of the workpiece.

Forming also a part of the backstop 21 and providing the fine adjustment between the workpiece and the backstop 21 is a fine-adjustment screw 26, which is mounted in a support or bracket 27 carried by the truss band 22. The fine adjustment screw 26 is provided with an abutment seat 28 that is adapted to engage the workpiece at its end remote from the chuck 16, and to project the shank of the workpiece into firm engagement with the jaw faces of the chuck by manual operation of the knob 29 that is carried by the screw 26 on the end thereof opposite the work locating seat 28.

The force exerted against the workpiece by tightening the fine-adjustment screw 26 serves to keep the sleeves 16 in position and also serves to hold pins 23 tightly in holes 24 and 25 to prevent them from dislodging.

The workpiece is positioned within the fixture by being inserted through the opening 17 of the body 11 and by being held in engagement with the chuck 16 by adjustment of the screw 26 in the manner hereinbefore described. So positioned the workpiece projects beyond the chuck end of the fixture. The lathe tool, not shown in the figure, is then positioned for refacing, turning and otherwise machining the projecting end of the workpiece. In the case of the workpiece being a tool with a tapered shank that has been damaged and is being reclaimed, the remachining by the lathe tool includes turning the taper of the shank and facing the end.

It is evident to those skilled in the art that in combination with a jaw chuck or other means this fixture could be used on large hollow-spindle lathe work.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A lathe fixture comprising a work support and a mounting therefor, the mounting comprising a device for attaching the fixture to the spindle of a lathe and locating means to center the work support with reference to the lathe spindle, the work support extending away from the mounting and comprising a container for the workpiece and a chuck concentric with the work support and being positioned at the end of the work support remote from the mounting, mechanism internal of the container for holding the workpiece at a position thereof away from the chuck.

2. A lathe fixture for turning a tool having a tapered shank at its end embodying the tapered shank, the fixture comprising a work support and a mounting therefor, the mounting comprising a device for attaching the fixture to the spindle of a lathe and locating means to center the work support with reference to the lathe spindle, the work support extending away from the mounting and comprising a container for the tool and a chuck concentric with the work support and being positioned at the end of the work support remote from the mounting, the chuck comprising a sleeve tapered to fit the taper of the tool shank, mechanism internally of the container to hold the tool shank pressed into the sleeve of the chuck.

3. In a lathe fixture as defined in claim 2, the mechanism inside the container being adjustable to adapt the fixture for holding tools of different sizes.

4. In a lathe fixture as defined in claim 2, a bracket carried by the container and supporting the mechanism inside the container, the bracket being adjustably positionable lengthwise of the container to adapt the fixture for holding tools of different sizes.

5. In a lathe fixture as defined in claim 4, the mechanism within the container being adjustably positionable with reference to the bracket lengthwise of the container.

FRITZ E. PECHNER.

REFERENCES CITED

The following references are of record in the file of this patent:

UNITED STATES PATENTS

| Number | Name | Date |
|---|---|---|
| 1,094,346 | Schellenback | Apr. 21, 1914 |
| 1,756,773 | Wendt | Apr. 29, 1930 |

Certificate of Correction

Patent No. 2,557,138                                                  June 19, 1951

FRITZ E. PECHNER

It is hereby certified that error appears in the printed specification of the above numbered patent requiring correction as follows:

Column 1, lines 49 and 50, for "interior" read *exterior*;

and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*